(12) United States Patent
Kucewicz et al.

(10) Patent No.: US 10,713,758 B2
(45) Date of Patent: Jul. 14, 2020

(54) FILTERING SYSTEMS AND METHODS FOR SUPRESSION OF NON-STATIONARY REVERBERATION IN ULTRASOUND IMAGES

(71) Applicants: John Kucewicz, Seattle, WA (US); Francesco P. Curra, Brier, WA (US); Gregory P. Darlington, Snohomish, WA (US); Lee D. Dunbar, Loon Lake, WA (US); Peter J. Kaczkowski, Seattle, WA (US); Justin Reed, Seattle, WA (US)

(72) Inventors: John Kucewicz, Seattle, WA (US); Francesco P. Curra, Brier, WA (US); Gregory P. Darlington, Snohomish, WA (US); Lee D. Dunbar, Loon Lake, WA (US); Peter J. Kaczkowski, Seattle, WA (US); Justin Reed, Seattle, WA (US)

(73) Assignee: University of Washington, Seattle, WA (US)

( * ) Notice: Subject to any disclaimer, the term of this patent is extended or adjusted under 35 U.S.C. 154(b) by 728 days.

(21) Appl. No.: 13/758,826

(22) Filed: Feb. 4, 2013

(65) Prior Publication Data

US 2013/0204135 A1 Aug. 8, 2013

Related U.S. Application Data

(60) Provisional application No. 61/594,244, filed on Feb. 2, 2012.

(51) Int. Cl.
*G06T 5/00* (2006.01)
*G06T 5/50* (2006.01)

(52) U.S. Cl.
CPC .............. *G06T 5/00* (2013.01); *G06T 5/50* (2013.01); *G06T 2207/10132* (2013.01); *G06T 2207/20212* (2013.01)

(58) Field of Classification Search
CPC .......... G05T 5/00; G05T 5/50; G01S 15/8995
See application file for complete search history.

(56) References Cited

U.S. PATENT DOCUMENTS

| | | | |
|---|---|---|---|
| 5,465,723 A | 11/1995 | Angelsen et al. | |
| 5,538,004 A * | 7/1996 | Bamber | G01S 7/52044 |
| | | | 128/916 |

(Continued)

FOREIGN PATENT DOCUMENTS

| CN | 101305925 A | 11/2008 |
|---|---|---|
| CN | 102136138 A | 7/2011 |

(Continued)

OTHER PUBLICATIONS

Wilhjelm et al., "Visual and Quantitative Evaluation of Selected Image Combination Schemes in Ultrasound Spatial Compound Scanning," IEEE Transactions on Medical Imaging, IEEE Service Center, Piscataway, NJ, vol. 23, No. 2 pp. 181-190 (Feb. 1, 2004).

(Continued)

*Primary Examiner* — Joseph M Santos Rodriguez
(74) *Attorney, Agent, or Firm* — Perkins Coie LLP (57) ABSTRACT

The present technology is generally directed to filtering systems and methods for suppression of reverberation artifacts in ultrasound images. In some embodiments, a method of obtaining a filtered ultrasound image includes taking a first ultrasound image of a target tissue using an applicator. At least a portion of the applicator is moved such that the reverberation artifact ultrasound path length changes relative to the first position of the applicator. A second ultrasound image of the target tissue is then taken. The first and second ultrasound images are synthesized using at least one (Continued)

filtering method. The filtering method attenuates or removes reverberation artifacts in the synthesized ultrasound image.

8 Claims, 8 Drawing Sheets

(56) References Cited

U.S. PATENT DOCUMENTS

| | | | |
|---|---|---|---|
| 6,210,328 B1 | 4/2001 | Robinson et al. | |
| 6,436,041 B1 | 8/2002 | Phillips et al. | |
| 6,485,423 B2 | 11/2002 | Angelsen et al. | |
| 6,511,426 B1 * | 1/2003 | Hossack | A61B 8/483 600/437 |
| 6,776,759 B2 | 8/2004 | Heimdal et al. | |
| 6,905,465 B2 | 6/2005 | Angelsen et al. | |
| 7,311,701 B2 * | 12/2007 | Gifford | A61B 8/12 128/898 |
| 7,670,291 B2 | 3/2010 | Vaezy et al. | |
| 2005/0277835 A1 * | 12/2005 | Angelsen | A61B 8/14 600/437 |
| 2005/0288587 A1 * | 12/2005 | Roh | A61B 8/4461 600/445 |
| 2006/0030776 A1 | 2/2006 | Washburn et al. | |
| 2006/0264748 A1 * | 11/2006 | Vaezy | A61B 8/12 600/437 |
| 2008/0175453 A1 | 7/2008 | Hao et al. | |
| 2008/0306382 A1 * | 12/2008 | Guracar | G01S 15/8995 600/437 |

FOREIGN PATENT DOCUMENTS

| | | |
|---|---|---|
| JP | 03114451 A | 5/1991 |
| JP | 03114452 A | 5/1991 |
| JP | 04338462 A | 11/1992 |
| JP | 09103434 A | 4/1997 |
| JP | 09182749 A | 7/1997 |
| JP | 10286256 A | 10/1998 |
| JP | 2006051356 A | 2/2006 |
| JP | 2006095151 A | 4/2006 |
| JP | 2007236681 A | 9/2007 |
| JP | 2008284329 A | 11/2008 |
| WO | 2011001310 A1 | 1/2011 |

OTHER PUBLICATIONS

Szabo, Thomas, "Chapter 10: Imaging Systems and Application," in Diagnostic Ultrasound Imaging: Inside Out, Elsevier Academic Press, USA pp. 297-336 (2004).

Zhu, "Adaptive Artifact Suppression in Ultrasound Image," Fourth International Conference on Image and Graphics, pp. 173-177 (2007).

T. Szabo, "Chapter 10: Imaging Systems and Applications" Diagnostic Ultrasound Imaging: Inside Out, 2004, pp. 297-336.

Office Action dated Aug. 4, 2015 in Japan Application No. 2014-555825, 11 pages.

Search Report dated Mar. 10, 2016 in European Application No. 13706334.3, 5 pages.

Wilhjelm et al., "Visual and Quantitative Evaluation of Selected Image Combination Schemes in Ultrasound Spatial Compound Scanning" IEEE Transactions on Medical Imaging, Feb. 2004, vol. 23, No. 2, pp. 181-190.

Office Action dated Feb. 15, 2016 in China Application No. 201380012973.0, 35 pages.

Zhu et al., "Remove the Artifact and Histogram Equalization for the Ultrasound Endoscopes Image" Microcomputer Information, Mar. 10, 2010, vol. 22(3), pp. 245-247.

International Search Report and Written Opinion dated May 6, 2013 in corresponding international application No. PCT/US2013/024663, 11 pages.

Office Action dated Sep. 14, 2016 in China Application No. 201380012973.0, 36 pages.

Office Action dated Aug. 9, 2016 in Japan Application No. 2014-555825, 8 pages.

Qigang et al., "Elimination of Artifact of Ultrasound Endoscope Image and Gray Scale Enhancement," Microcomputer Information, vol. 22(3), Mar. 10, 2006, pp. 245-247.

* cited by examiner

FILTERING SYSTEMS AND METHODS FOR SUPRESSION OF NON-STATIONARY REVERBERATION IN ULTRASOUND IMAGES

CROSS-REFERENCE TO RELATED APPLICATION

The present application claims priority to U.S. Provisional Patent Application No. 61/594,244, filed Feb. 2, 2012, which is incorporated herein by reference in its entirety.

TECHNICAL FIELD

The present technology is generally directed to filtering systems and methods for suppression of non-stationary reverberation in ultrasound images.

BACKGROUND

Conventional medical ultrasound imaging systems transmit short bursts of high frequency sound from an array of transducer elements and then receive the sound after it has propagated through tissue and been reflected back towards the transducer array. With knowledge of the speed of sound in tissue, which is typically assumed to be a constant 1540 m/s, an image of the tissue can be created based on the time delay between the transmission and reception of the ultrasound—assuming the sound has traveled directly from the transducer array to the reflecting tissue and directly back to the transducer array. If, however, the sound is reflected multiple times, the time delay will no longer correspond to the physical location of the ultrasound reflector, and structures may appear in the ultrasound image in locations other than their true physical location. These reverberation artifacts can obscure tissue features within the ultrasound image, and can adversely affect the quality of the ultrasound image. The artifacts can be "non-stationary" in that the apparent position of the reverberation artifact is moving relative to the tissue/material being imaged.

Non-stationary reverberation artifacts are likely to occur in, for example, ultrasound therapy devices with separate imaging and therapy transducers coupled to the patient through fluid, where the position of the imaging transducer is fixed relative to the patient and the therapy transducer is moving relative to the patient to vary the focus of the therapy transducer to treat a volume of tissue. In such a system, there may also exist stationary artifacts as a result of multiple reflections of the ultrasound wave off of stationary components within the same device. In such systems, secondary reflections from the therapy transducer or other surfaces are likely to produce artifactual reverberant images within the tissue image, thereby obscuring details of the tissue. Accordingly, there exists a need for removing reverberant artifacts from ultrasound images.

DETAILED DESCRIPTION

The present technology is generally directed to filtering systems and methods for suppression of reverberation artifacts in ultrasound images. In some embodiments, a method of obtaining a filtered ultrasound image includes taking a first ultrasound image of a target tissue using an applicator. At least a portion of the applicator is moved such that the reverberation artifact ultrasound path length changes relative to the first position of the applicator. A second ultrasound image of the target tissue is then taken. The first and second ultrasound images are synthesized using at least one filtering method. The filtering method attenuates or removes reverberation artifacts in the synthesized ultrasound image.

Specific details of several embodiments of the technology are described below with reference to FIGS. 1-7. Other details describing well-known structures and systems often associated with ultrasound imaging have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-7.

Figure 1:
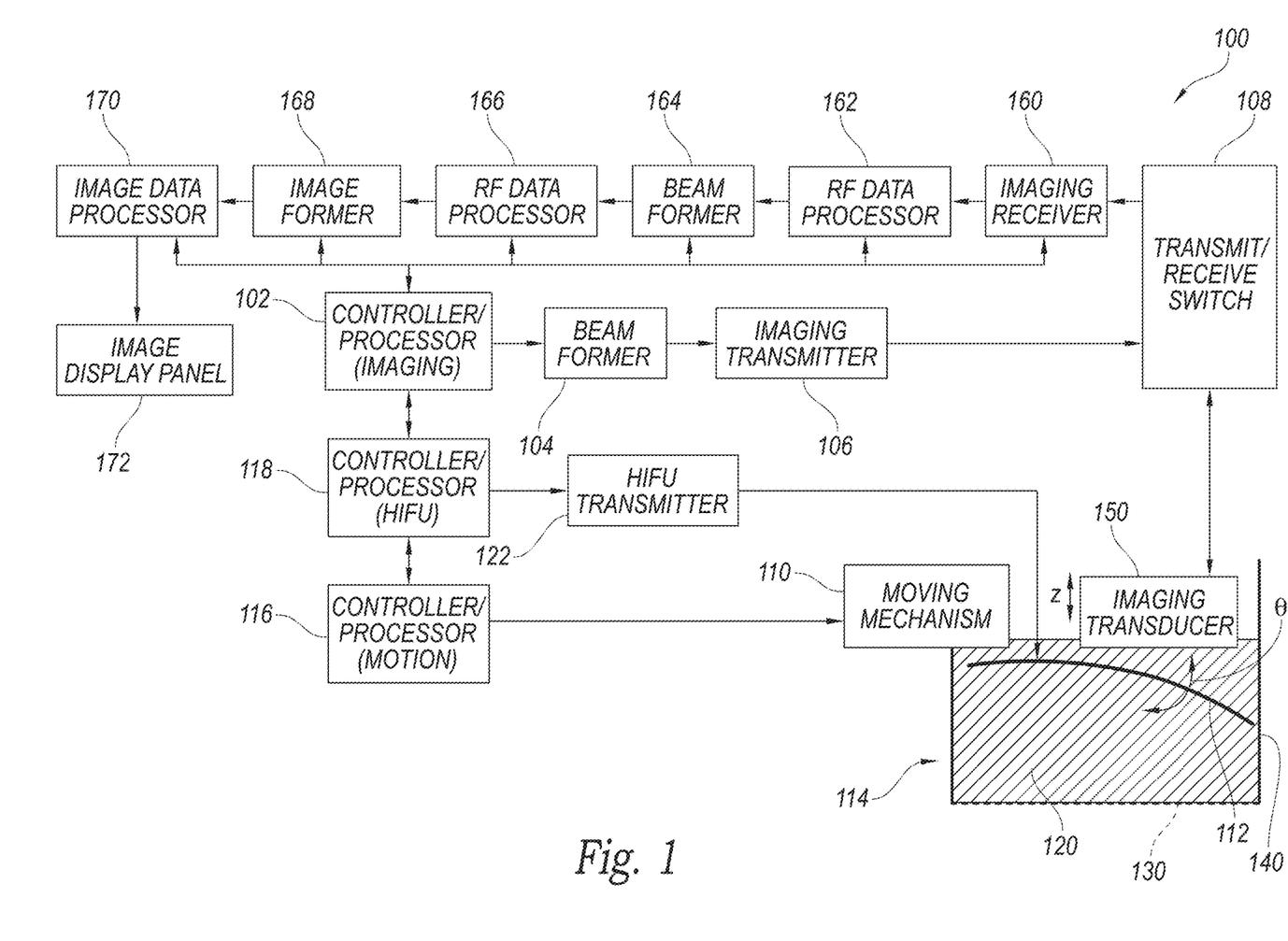
FIG. 1 is a schematic illustration of a system for filtering non-stationary reverberation artifacts configured in accordance with embodiments of the present technology.

FIG. 1 is a schematic illustration of a system 100 for filtering non-stationary reverberation artifacts configured in accordance with embodiments of the present technology. The system 100 can include an applicator 114 configured to take ultrasound images of target tissue. As will be described in further detail below, the applicator 114 can include an imaging transducer 150 and a High Intensity Focused Ultrasound (HIFU) transducer 112 positioned in or proximate to a housing 140 having a patient interface cap 130. The applicator 114 can further include a movement mechanism 110 configured to move at least one of the imaging transducer 150 or HIFU transducer 112 relative to the target tissue.

The HIFU source or transducer 112 can be configured to emit high levels of ultrasound energy. In several embodiments, the system 100 includes a plurality of transducers 112 operated collectively or independently. The HIFU transducer 112 can receive instructions from a HIFU controller 118 regarding duration, frequency, amplitude, and/or other factors associated with HIFU treatment. More specifically, the HIFU controller 118 can communicate with a HIFU transmitter 122 capable of generating electrical waveforms to drive the HIFU transducer 112.

An imaging controller 102 can control operation of the system 100. For example, the imaging controller 102 can communicate (e.g., send and receive instructions) with the HIFU controller 118. The imaging controller 102 can further communicate with and send instructions to a beam former 104 capable of controlling or configuring aspects of the HIFU transducer 112 output. For example, the beam former 104 can set waveform delays in the HIFU transducer 112 for steering the ultrasound beam. The beam former 104 can communicate with an imaging transmitter 106 that can include pulse and/or waveform drive circuitry. For example, the imaging transmitter 106 can drive the desired waveform to the imaging transducer 150. The imaging transducer 150 can receive the waveform instructions as electrical signals from a transmit/receive switch 108. In some embodiments, the transmit/receive switch 108 can include a stage for blocking high amplitude transmit signals. The imaging transducer 150 can convert the electrical signals from the transmit/receive switch 108 into acoustic signals that can be utilized by the HIFU transducer 112.

As discussed above, the HIFU transducer 112 can be moved or adjusted by one or more moving mechanisms 110. For example, in some embodiments, the moving mechanism 110 comprises a steering wobble to adjust a position of the HIFU transducer 112 along angle θ. In further embodiments, the moving mechanism 110 can comprise an elevation adjustment to modify the elevation of one or both of the HIFU transducer 112 and the imaging transducer 150 along the z-axis. In still further embodiments, the HIFU transducer 112, imaging transducer 150, or other component(s) can be pivoted, translated, adjusted, or otherwise moved by other mechanisms or in other directions or angles. The moving mechanism 110 can receive movement and/or positioning instructions from a motion controller 116 in order to adjust the HIFU transducer 112 and/or imaging transducer 150 to a desired position. As will be discussed in further detail below with reference to FIGS. 2A-7, in several embodiments the motion controller 116 can be used to move the HIFU transducer 112 and/or imaging transducer 150 into sequential, offset positions to obtain iterative data to be used as part of a filtering process to attenuate non-stationary reverberation artifacts. In several embodiments, the motion controller 116 can be in communication with the HIFU controller 118 or can comprise the same device as the HIFU controller 118.

In several embodiments, the system 100 includes transducer fluid 120 that can be positioned between the HIFU transducer 112 and the tissue. The patient interface cap 130 can comprise a membrane interface that retains the transducer fluid 120 in the housing 140 and is proximate to the target tissue. In some embodiments, the housing 140 further encloses or contains the HIFU transducer 112. While the HIFU transducer 112, imaging transducer 150, patient interface cap 130, housing 140, movement mechanism 110, and/or other components have collectively been referred to as the "applicator" 114, it will be appreciated that in further embodiments, the term "applicator" 114 can refer to the entire ultrasound imaging assembly, or individual components or subcomponents thereof. For example, in some embodiments the term "applicator" 114 can refer to one of the HIFU transducer 112 or imaging transducer 150. In still further embodiments, the term "applicator" 114 can refer to a reflective surface portion or other feature of the imaging transducer 150, HIFU transducer 112, housing 140, or other portion of the system 100. In further embodiments, the "applicator" includes any aspect of the system 100 that interfaces with a user (e.g., a medical practitioner) or a patient.

Along with providing acoustic signals to the HIFU transducer 112 or other surfaces within the housing 140, the imaging transducer 150 can receive acoustic signals from the HIFU transducer 112 and convert the acoustic signals into electrical signals to be passed to the transmit/receive switch 108 and processed by downstream processing components. For example, the transmit/receive switch 108 can pass the electrical signals to an imaging receiver 160 which can include amplifiers, filters, and data conversion circuitry for receiving the electronic signals from the transducer elements. The imaging receiver 160 can pass the received signal or data to a radiofrequency (RF) data processor 162. More specifically, as discussed above, the received signal (or series of time- or positionally-offset signals) can be passed to the RF data processor 162 for filtering. The RF data processor 162 can filter reverberation and/or other artifacts from the RF data. As will be discussed in further detail below, filtering can include any process by which non-stationary reverberant signals are attenuated prior to image rendering. The RF data processor 162 can pass the data to a beam former 164 that can perform RF channel data processing for steering the received data. The data can then pass to another RF data processor 166 to filter and/or process the digital signal to remove or reduce reverberation and/or other artifacts. In other embodiments, the system 100 may include only one RF data processor either before or after the beam former 164, while in still further embodiments there may be more than two RF data processors at these or other locations in the system 100. The filtered data can then pass to an image former 168 to generate an ultrasound image from the beam formed data. The image is sent to an image data processor 170 configured to filter the reverberation and/or other artifacts from the image data. In some embodiments, one or more of the imaging receiver 160, the RF data processors 162, 166, the beam former 164, the image former 168, and the image data processor 170 communicate with, receive instructions from, and/or provide feedback to the imaging controller 102 as part of overall system control. Finally, the filtered image is displayed on an output device or monitor, such as an image display panel 172. It will be appreciated that the system 100 may include different features and/or have a different arrangement. For example, in further embodiments, one or more of the components of the system 100 described above can be eliminated. In still further embodiments, the functionality of individually-described components of the system 100 may be combined into a single device or subcomponent.

The term "filtering" has been used broadly herein, and can include any suitable filtering methods or techniques. Various filtering methods could be implemented individually or in combination at various points in the signal processing pathway. Possible filters include, but are not limited to, finite-impulse-response (FIR) filters, infinite-impulse-response (IIR) filters, regression filters, and percentile filters. Filtering could be done channel-by-channel before beam forming (e.g., at the RF data processor 162), after beam forming (e.g., at the RF data processor 166), or after image formation at the image data processor 170. The choice of filters may be dictated by the hardware and software capabilities of the ultrasound system on which the filtering methods are implemented. Further details regarding several suitable filters are provided below.

FIR/IIR Filters—FIR and IIR filters can be used in ultrasound systems, particularly for Doppler imaging of blood flow to suppress signals from tissue. In some embodiments, a low-pass or band-stop filter can be used with a fixed set of precomputed filter coefficients. In another embodiment, filter coefficients can be adaptively computed based on the velocity (or other metric indicative of motion) of the reverberation artifact. In this embodiment, Doppler methods (or other known ultrasound methods for estimating motion) would be used to estimate velocity, and from this velocity estimate, filter coefficients can be adaptively adjusted to optimally suppress reverberation. In another embodiment, multiple sets of filter coefficients could be precomputed and interchanged based on a priori knowledge of the velocity of the reverberant source during pulse transmission/reception.

Regression Filters—Regression filters can be used, for example, in Doppler ultrasound processing, particularly for color Doppler and power Doppler. With color Doppler and power Doppler, the ultrasound data can be fit to a low order polynomial function and the residual can be used for blood flow calculation. For reverberation suppression, the residual will be dominated by the reverberant signals and can be discarded, and the fit will be dominated by the tissue signal.

Averaging Filters—Averaging filters average the signals from multiple pulses. These filters are a conceptual variant of FIR filters. Averaging could be weighted or unweighted. In some embodiments, each pulse could be weighted in inverse proportion to its amplitude under the operating assumption that the strongest signals are reverberant.

Percentile Filters—Percentile filters sort signals by amplitude and retain signals at, above, or below a certain threshold. In one embodiment, a minimum filter is used whereby only the pulse with the minimum amplitude on a pixel-by-pixel basis is retained.

It will be appreciated that the system 100 and other systems/methods described herein may utilize one or more of the above-described filters, or other suitable filters.

Figure 2A:
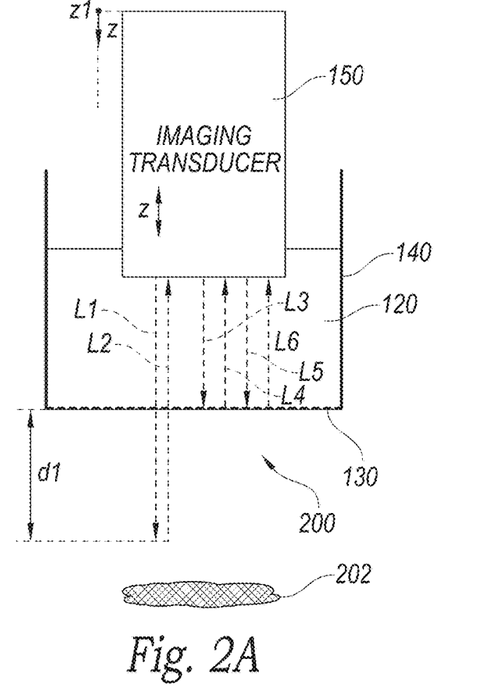
FIG. 2A is a schematic illustration of an imaging transducer acquiring an ultrasound image at a first position in accordance with embodiments of the technology.
Figure 2B:
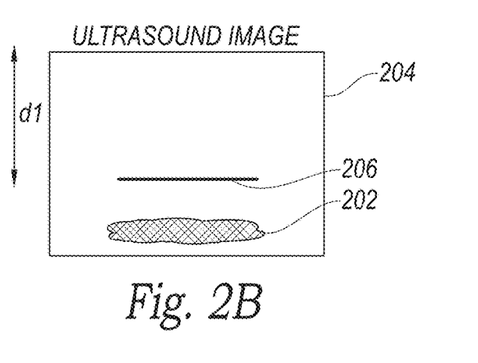
FIG. 2B is a partially schematic illustration of an ultrasound image of a reverberation artifact from the ultrasound acquisition of FIG. 2A in accordance with embodiments of the technology.

FIG. 2A is a schematic illustration of an imaging transducer acquiring an ultrasound image at a first position in accordance with embodiments of the technology. FIG. 2B is a partially schematic illustration of an ultrasound image of a reverberation artifact from the ultrasound acquisition of FIG. 2A in accordance with embodiments of the technology. Referring to FIGS. 2A and 2B together, the imaging transducer 150 is positioned at a depth $z_1$ at least partially in the housing 140. The imaging transducer 150 sends an ultrasound wave along path $L_1$ through transducer fluid 120 and the patient interface cap 130 to patient tissue 200. The tissue 200 includes a tissue feature 202 that is a characteristic in the tissue 200 that produces an ultrasound image echo or volume. As shown in FIG. 2B, the ultrasound image 204 is configured to be displayed to a user such as a medial practitioner. The ultrasound image 204 includes an artifact 206 that is the result of the reverberated acoustic waveform with reverberation signal pathway length $L_3+L_4+L_5+L_6$ shown at an equivalent depth represented by $d_1$.

Figure 2C:
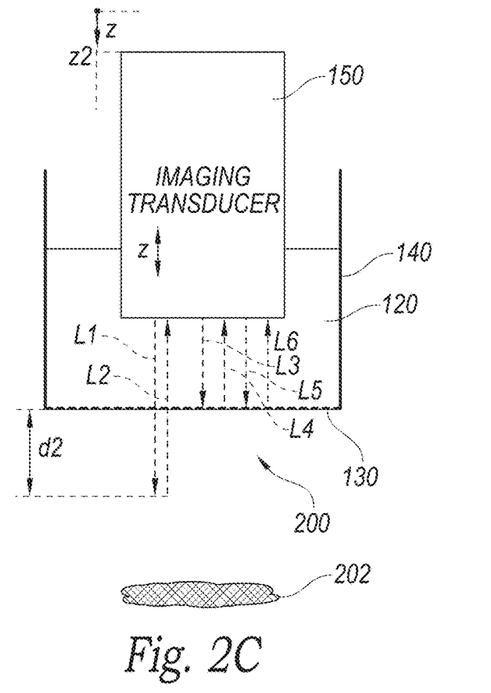
FIG. 2C is a schematic illustration of an imaging transducer acquiring an ultrasound image at a second position in accordance with embodiments of the technology.
Figure 2D:
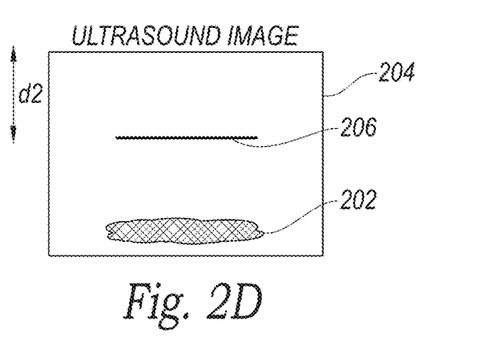
FIG. 2D is a partially schematic illustration of an ultrasound image of a reverberation artifact from the ultrasound acquisition of FIG. 2C in accordance with embodiments of the technology.

FIGS. 2C and 2D illustrate a similar arrangement. FIG. 2C, for example, is a schematic illustration of an imaging transducer acquiring an ultrasound image at a second position in accordance with embodiments of the technology. In this arrangement, however, imaging transducer 150 is positioned at the depth $z_2$. FIG. 2D is a partially schematic illustration of an ultrasound image of a reverberation artifact from the ultrasound acquisition of FIG. 2C in accordance with embodiments of the technology. As shown in FIG. 2D, the ultrasound image 204 includes the artifact 206 that is the result of the reverberated acoustic waveform with path length $L_3+L_4+L_5+L_6$ shown at an equivalent depth represented by $d_2$.

The reverberation artifact 206 occurs when two or more reflections of an acoustic waveform occur within the transducer fluid volume 120, and all or part of the reflected acoustic waveform is received by the imaging transducer 150. Reverberation artifact conditions occur with conventional imaging transducers within the material between the ceramic transducer elements and the tissue interface, though the energy usually attenuates to a sufficient level prior to the imaging depth of interest. The imaging transducer 150 receives the reverberated waveform simultaneously with the waveform reflected from the tissue. These two received waveforms are processed by the ultrasound system and displayed on the ultrasound image 204 such that the reverberation artifact 206 shows up at a distance from the transducer equivalent to half the reverberation path length $((L_2+L_3+L_4+L_5)/2)$. Although the reverberation path $(L_2+L_3+L_4+L_5)$ shown is that of a simple two surface reflection, the acoustic waveform could reflect from many surfaces within the transducer fluid 120 before being received by the imaging transducer 150. When the image data is received and processed into an ultrasound image, the surface of the imaging transducer 150 shows up as a reverberation artifact 206 at a distance from the imaging transducer 150 equal to that of the reverberation path length ($d_1$ or $d_2$).

Figure 2E:
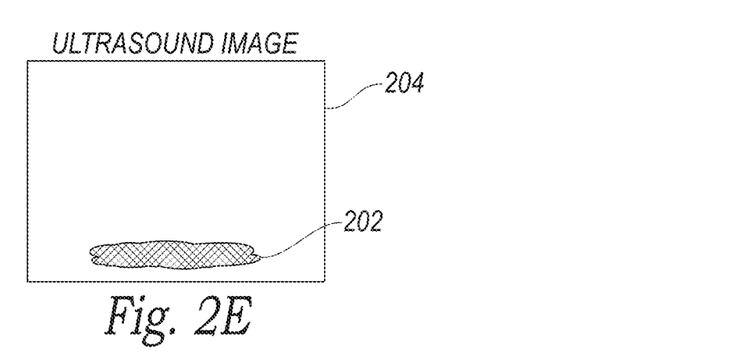
FIG. 2E is a partially schematic illustration of an ultrasound image synthesized from the ultrasound images of FIGS. 2B and 2D after the reverberation artifact has been filtered out in accordance with embodiments of the technology.

The system 100 described above with reference to FIG. 1 can leverage the shift in the reverberation path length when either the imaging transducer 150 or a reflecting surface (such as the HIFU transducer 112) is shifted to cause a change in the reverberation path length ($L_2+L_3+L_4+L_5$). For example, when the imaging transducer 150 shifted from position $z_1$ to position $z_2$, the resulting reverberation artifact 206 appears at respective depths $d_1$ and $d_2$. FIG. 2E, for example, is a partially schematic illustration of an ultrasound image synthesized from the ultrasound images of FIGS. 2B and 2D after the reverberation artifact has been filtered out. As shown in FIG. 2E, by combining two data sets captured at $z_1$ and $z_2$ respectively, a third data set can be produced in which the reverberation artifact 206 is not present. Although the technology discussed herein can refer to processing two data sets, the respective algorithms can be applied to more than two data sets as well. In some embodiments, the number of transducer positions and respective data sets can be in the range of 4 to 8. In further embodiments, the reverberation path length can shift when using a compound imaging technique, in which the acoustic waveform is transmitted at different steering angles from different sets of ceramic elements of the ceramic transducer array.

Although for some techniques described herein, it may be desirable for the reverberation artifact 206 to reside at a depth $d_2$ in which the artifact 206 does not overlap with the artifact 206 at a depth $d_1$, other techniques such as those that leverage a "velocity" of the artifact 206 do not require the extent of separation $d_2$-$d_1$. In these cases, the change in position of the received energy may be small, with the energies overlapping in time and space, though the velocity can still be leveraged. Currently known signal processing techniques and algorithms can then be applied to filter out the "moving" energy between subsequent or a series of data sets.

It should also be noted that although the algorithms described indicate a serial process of capturing data at multiple positions or transmit angles and processing the multiple data sets for a single image, in further embodiments the data can be processed in a manner such that the number of displayed images are equal to the number of acquired data sets (e.g. using a sliding window and parallel processing).

Various methods can be employed to acquire ultrasound data and filter the data to attenuate non-stationary reverberation artifacts. In a first method 300, illustrated as a block diagram in FIG. 3, a sequence of repeated ultrasound pulses separated by a fixed or variable time interval are obtained and define an ensemble of pulses which are then filtered prior to image formation to attenuate the portion of the signal attributable to the non-stationary reverberation artifact, such as a moving HIFU transducer. At block 302, the method 300 includes positioning an imaging transducer at time t(1), and setting a counter k to equal 2. At block 304, an ultrasound image is acquired at time t(1). At block 306, the method 300 includes waiting until time t(k). A subsequent ultrasound image k is acquired at block 308. This process is repeated at blocks 310 and 312 with iterative ultrasound images, until the process reaches the final time t(K). As mentioned above, the times between ultrasound pulses can be fixed, variable, or random.

Figure 3:
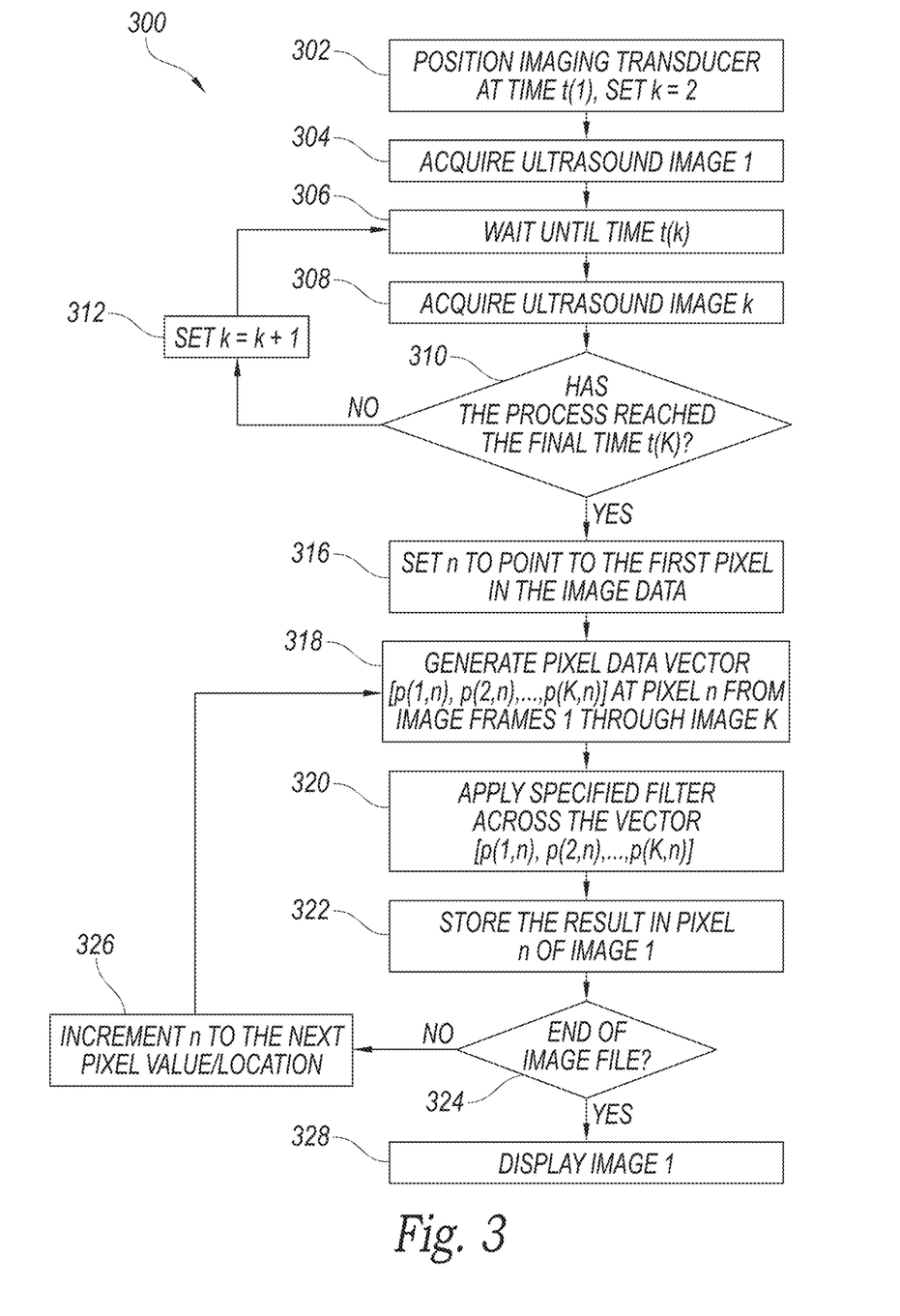
FIG. 3 is a block diagram illustrating a method of acquiring and filtering ultrasound data to remove non-stationary reverberation artifacts in accordance with embodiments of the technology.

At block 316, a counter n is set to point to the first pixel in the image data. A pixel data vector is generated at block 318 at pixel n from image 1 through image K. A filter (such as any of the filters mentioned above with reference to FIG. 1), is applied across the vector at block 320. The filter can be used to remove artifacts from the ultrasound image moving at a velocity that falls outside a pre-determined range, such as reverberation artifacts that are moving more quickly than tissue or bodily fluids. In further embodiments, the filter can be set such that the moving tissues and fluids are filtered out with the reverberation artifacts; such a filter can be useful, for example, if the function of the image is to convey stationary tissue boundaries. In particular embodiments, the filter is a low-pass filter, such as a regression filter, FIR filter, or IIR filter. Alternatively, a band-stop filter could be used to more-selectively filter the reverberation artifact if its apparent velocity is known a priori.

At block 322, the result of the filtering is stored in pixel n of image 1. This filtering process is repeated at blocks 324 and 326 until the end of the image file is reached. In some embodiments, the time interval between pulses, the ensemble length, and/or the filter order and coefficients could be manually or adaptively varied to improve filter performance. After the image has been filtered, image 1 is displayed at block 328. It will be appreciated that in other embodiments the method 300 may include additional steps and/or one or more of the foregoing steps may be eliminated.

Figure 4A:
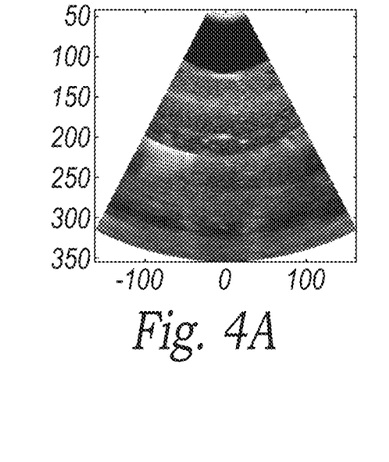
FIG. 4A is an illustration of an ultrasound image prior to filtering in accordance with embodiments of the technology.
Figure 4B:
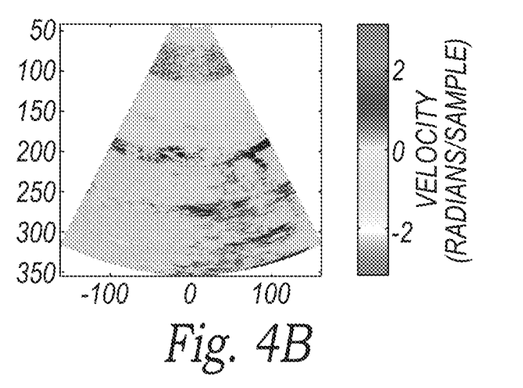
FIG. 4B is an illustration of the velocity distribution of the ultrasound signal during the acquisition of the ultrasound image of FIG. 4A in accordance with embodiments of the technology.
Figure 4C:
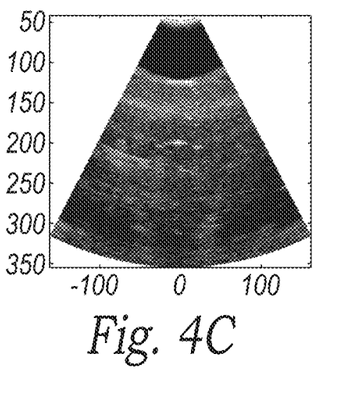
FIG. 4C is an illustration of the ultrasound image of FIG. 4A after filtering the image based on the velocity distribution of FIG. 4B in accordance with embodiments of the technology.

FIG. 4A is an illustration of an ultrasound image prior to filtering in accordance with embodiments of the technology. FIG. 4B is an illustration of the velocity distribution of the ultrasound signal during the acquisition of the ultrasound image of FIG. 4A in accordance with embodiments of the technology. FIG. 4C is an illustration of the ultrasound image of FIG. 4A after filtering the image based on the velocity distribution of FIG. 4B in accordance with the method discussed above with reference to FIG. 3. In a particular embodiment, a regression filter with an ensemble of 16 pulses can be used. The resulting, filtered ultrasound image shows significant reduction of the high-speed reverberation artifacts, providing a clearer image of target tissue.

Figure 5:
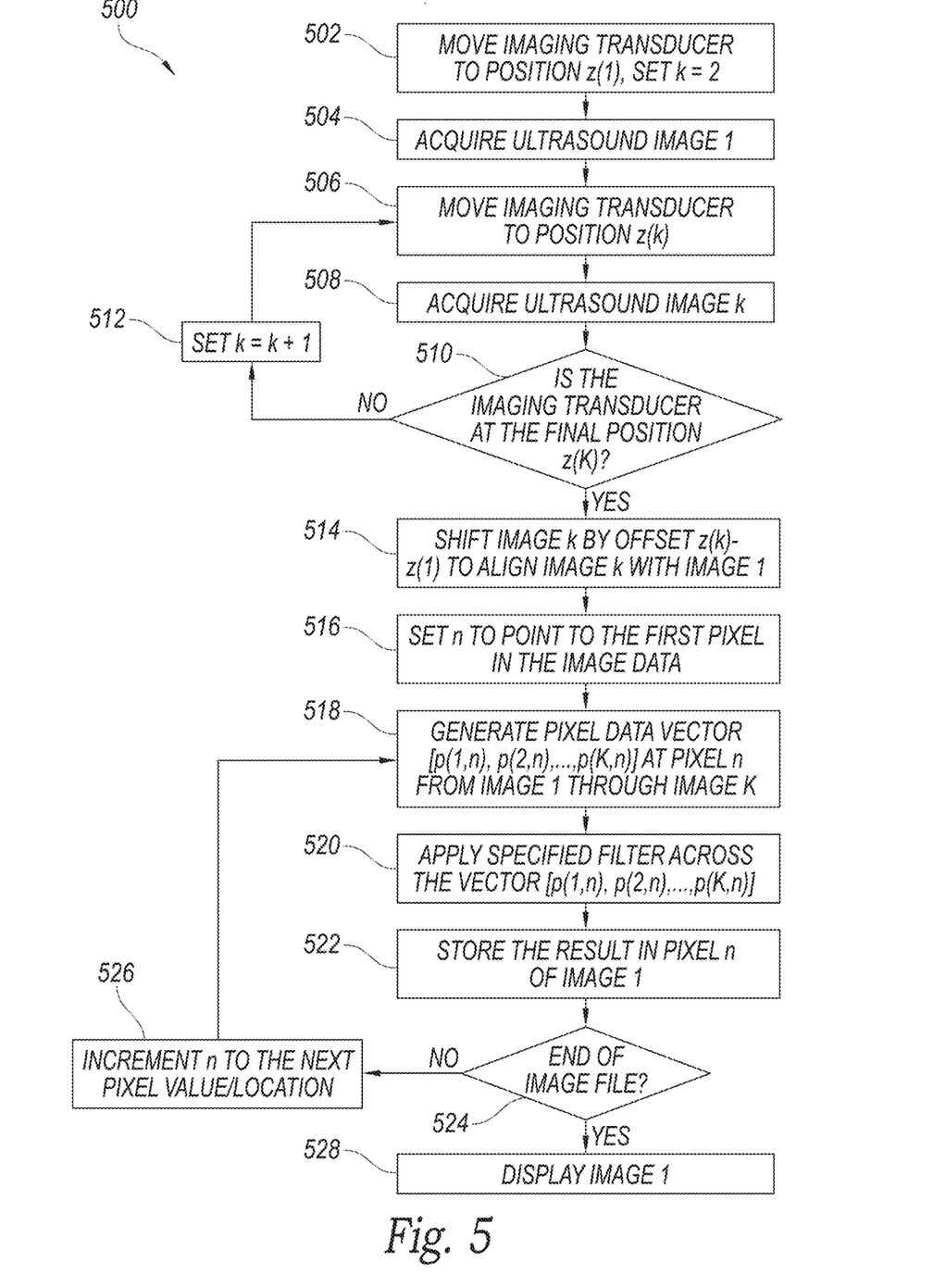
FIG. 5 is a block diagram illustrating another method of acquiring and filtering ultrasound data to remove non-stationary reverberation artifacts in accordance with embodiments of the technology.

The effectiveness of the method 300 described with reference to FIG. 3 is dependent on dissimilarities in the velocity of the tissue and the apparent velocity of the reverberation. FIG. 5 is a block diagram illustrating a method 500 that includes translating the imaging transducer to create or enhance dissimilarities in the velocities of the tissue and reverberation. As the imaging transducer is translated, the apparent position of the tissue will be translated an equal amount and the apparent position of the faster-moving reverberation will be translated a greater amount. Using this method 500, both stationary and non-stationary artifacts can thus be more readily identified for attenuation or removal.

At block 502, for example, the method 500 includes positioning an imaging transducer at position z(1), and setting a counter k to equal 2. At block 504, an ultrasound image is acquired at position z(1). At block 506, the method 500 includes moving the imaging transducer to position z(k). A subsequent ultrasound image k is acquired at block 508 at position z(k). This process is repeated at blocks 510 and 512 with iterative ultrasound images, until the process reaches the final position z(K). In some embodiments, the position of the imaging transducer is under computer control, while in other embodiments the imaging transducer is positioned under manual control.

At block 514, the images 1 and k are aligned, and a counter n is set to point to the first pixel in the image data at block 516. A pixel data vector is generated at block 518 at pixel n from image 1 through image K. A filter (such as any of the filters mentioned above with reference to FIG. 1), is applied across the vector at block 520. The filter can be used to remove artifacts from the ultrasound image that fall at two or more distinct and separate locations in two or more image frames. Alternatively, the filter can be used to remove artifacts from the ultrasound image moving at a velocity that falls outside a pre-determined range, such as reverberation artifacts that are moving more quickly than tissue or bodily fluids. The velocity of the reverberation may be exaggerated (and easier to filter out) because the imaging transducer acquired data at multiple positions. The result of the filtering is stored in pixel n of image 1 at block 522. This filtering process is repeated at blocks 524 and 526 until the end of the image file is reached. At block 528, the filtered image is displayed.

Figure 6:
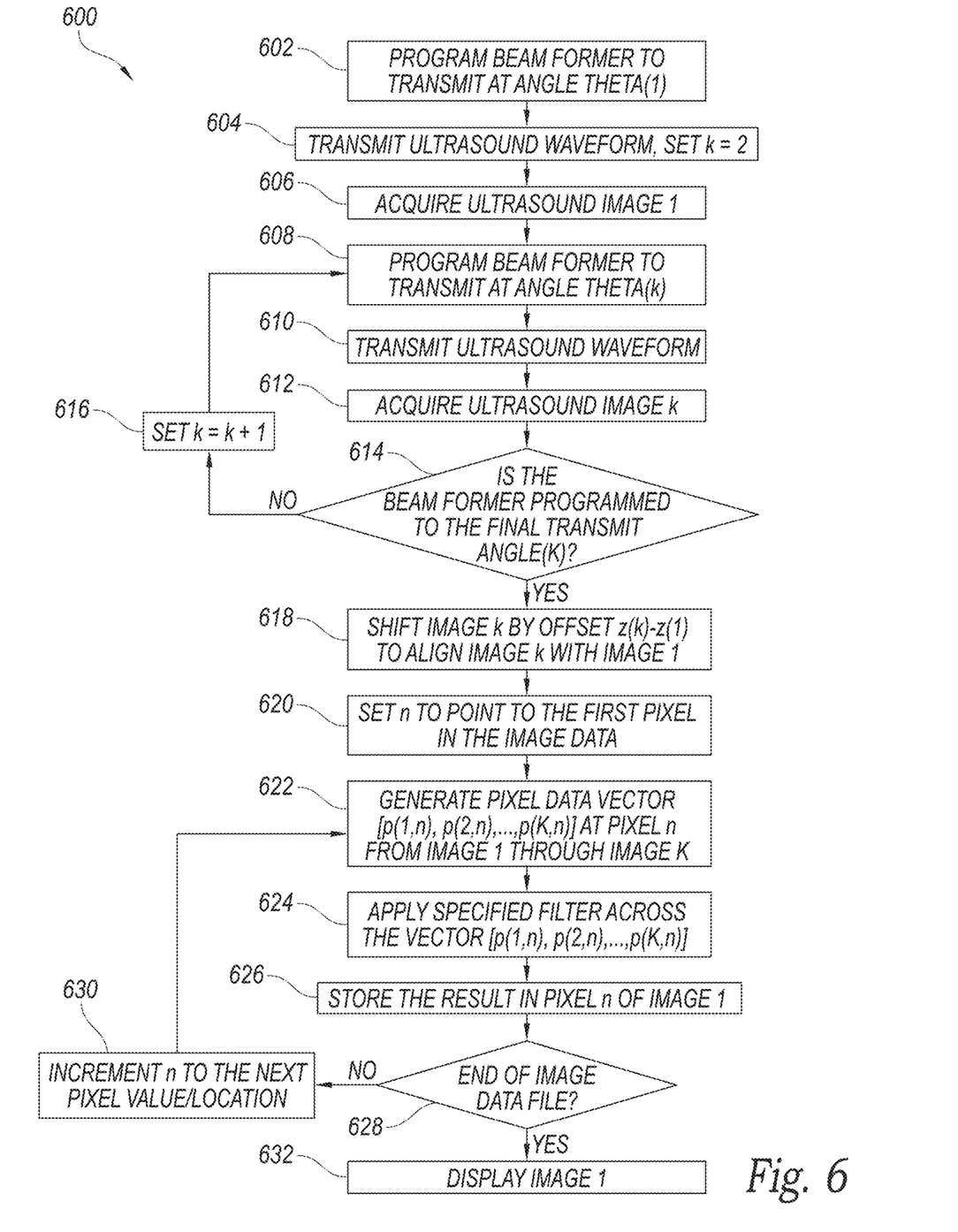
FIG. 6 is a block diagram illustrating another method of acquiring and filtering ultrasound data to remove non-stationary reverberation artifacts in accordance with embodiments of the technology.

FIG. 6 is a block diagram illustrating another method 600 of acquiring and filtering ultrasound data to remove non-stationary reverberation artifacts. The method 600 takes into account that the apparent position of reverberant objects can be dependent on the direction of sound propagation. The method 600 uses a sequence of pulses transmitted in different directions. The pulses are then filtered to suppress features not common to all imaging directions. To reduce the artifacts caused by movement of the target tissue and/or parts of a HIFU system, sequential pulses can be done for a specific area of focus.

At block 602, for example, the method 600 includes programming a beam former to transmit an ultrasound waveform at angle theta(1). The waveform is transmitted at block 604 and a counter k is set to 2; Ultrasound image 1 is acquired at block 606. Iteratively, at blocks 608-616, subsequent ultrasound images are iteratively acquired until the final transmit angle theta(K) is acquired.

At block 618, the images 1 and k are aligned, and at block 620 the counter n is set to point to the first pixel in the image data. A pixel data vector is generated at block 622 at pixel n from image 1 through image K. A filter (such as a minimum filter, weighted average filter, or other filter), is applied across the vector at block 624. The spatial compounding of these multiple steered angles can be used to reduce speckle in addition to attenuating reverberant objects. The reverberant object reflections to the various steered pulses will have a higher variance than those of tissue. This variance can be used to segment out the reverberant objects. The result of the filtering is stored in pixel n of image 1 at block 626. This filtering process is repeated at blocks 628 and 630 until the end of the image file is reached. The filtered image is displayed at block 632.

Figure 7:
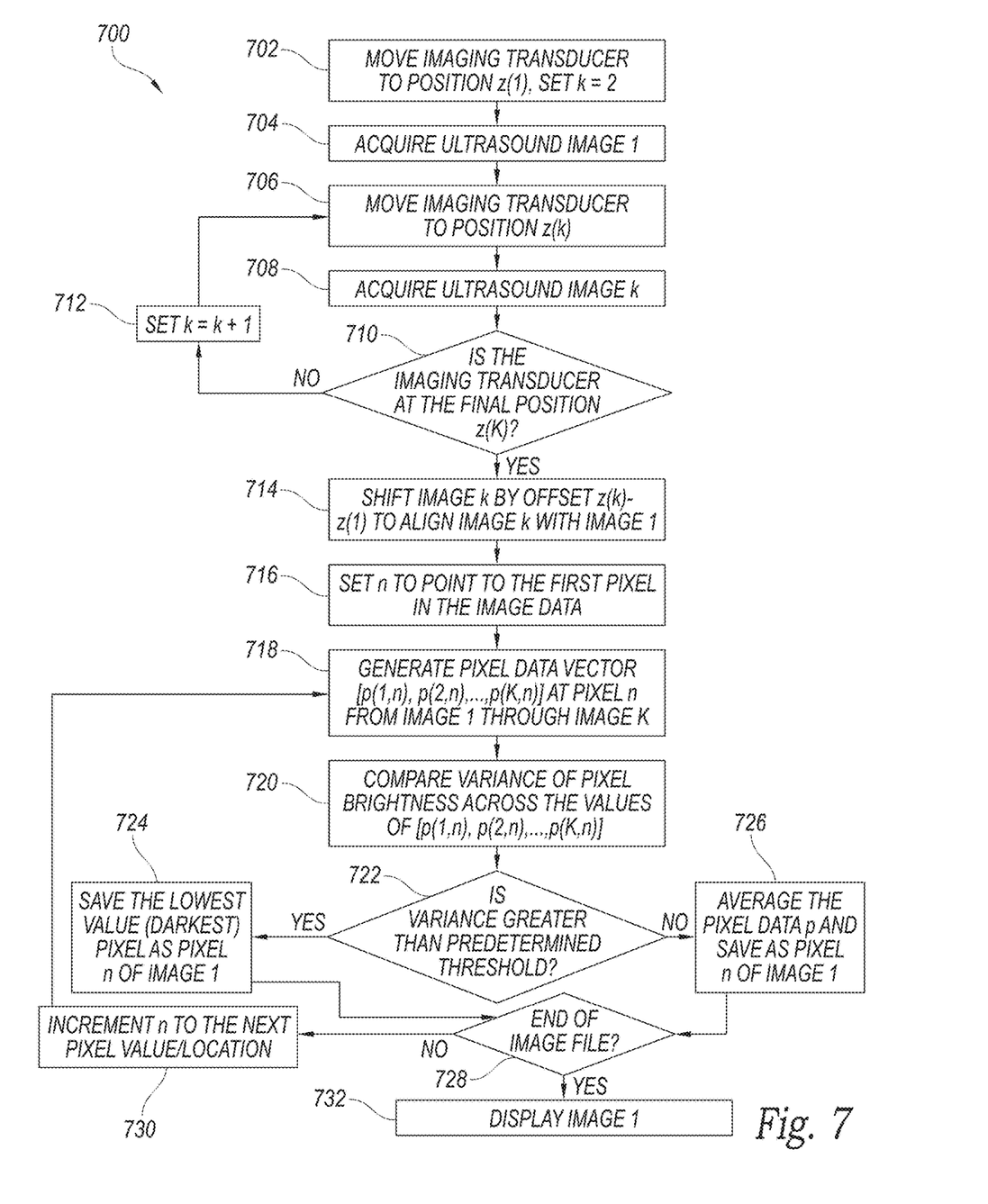
FIG. 7 is a block diagram illustrating another method of acquiring and filtering ultrasound data to remove non-stationary reverberation artifacts in accordance with embodiments of the technology.

FIG. 7 is a block diagram illustrating yet another method 700 of acquiring and filtering ultrasound data to remove non-stationary reverberation artifacts. As shown in FIG. 7, additional filtering could be applied on sequences of images to further suppress reverberation. Within a single image, the degree to which reverberation can be suppressed will vary with the velocity of the structure generating the reverberation artifact. If the degree of suppression varies considerably from image to image, sequences of images could be filtered or "stitched" together for additional reverberation suppression. Possible filters include but are not limited to mean, median, and minimum filters applied between images.

At block 702, for example, the method 700 includes positioning an imaging transducer at position z(1), and setting a counter k to equal 2. At block 704, an ultrasound image is acquired at position z(1). At block 706, the method 700 includes moving the imaging transducer to position z(k). A subsequent ultrasound image k is acquired at block 708 at position z(k). This process is repeated at blocks 710 and 712 with iterative ultrasound images, until the transducer reaches the final position z(K). In some embodiments, the position of the imaging transducer is under computer control, while in other embodiments the imaging transducer is positioned under manual control.

At block 714, the images 1 and k are aligned, and a counter n is set to point to the first pixel in the image data at block 716. A pixel data vector is generated at block 718 at pixel n from image 1 through image K. At block 720, the variance of pixel brightness is compared across the images, and a filtering technique is applied. In some embodiments, as shown at blocks 722 and 724, if the variance is greater than a predetermined threshold then the lowest (i.e., darkest) pixel value is saved on image 1. If the variance is within the threshold, the average of the pixel data is saved on image 1 at block 726. This process is repeated at blocks 728 and 730 for all pixels in the image file. In one alternative embodiment, only the minimum value of [p(1,n), p(2,n), . . . , p(K,n)] is stored in pixel n of image 1. In yet another embodiment, only the average value of [p(1,n), p(2,n), . . . , p(K,n)] is stored in pixel n of image 1. In still another embodiment, the reverberation path length is varied by moving the HIFU transducer 100. The filtered image is displayed at block 732.

EXAMPLES

The following Examples are illustrative of several embodiments of the present technology.

1. A method of obtaining an ultrasound image, the method comprising:
   taking a first ultrasound image of a target tissue via an applicator;
   moving at least a portion of the applicator;
   taking a second ultrasound image of the target tissue via the applicator;
   synthesizing the first ultrasound image with the second ultrasound image; and
   eliminating a reverberation artifact in the synthesized ultrasound image.

2. The method of example 1 wherein moving at least a portion of the applicator comprises moving a reflective surface of the applicator.

3. The method of example 1 wherein moving at least a portion of the applicator comprises moving an imaging transducer.

4. The method of example 1 wherein moving at least a portion of the applicator comprises moving a high-intensity focused ultrasound transducer.

5. The method of example 1 wherein moving at least a portion of the applicator comprises at least one of translating or adjusting an angle of the portion of the applicator.

6. The method of example 1 wherein eliminating the reverberation artifact comprises employing a low-pass filter to the first ultrasound image and second ultrasound image.

7. The method of example 1 wherein eliminating the reverberation artifact comprises employing at least one of a regression filter, a finite-impulse-response filter, an infinite-impulse-response filter, or a band-stop filter.

8. The method of example 1 wherein eliminating the reverberation artifact comprises using at least one of a mean, median, or minimum filter.

9. A method of suppressing a non-stationary reverberation artifact in ultrasound imaging, the method comprising:
   transmitting, by an imaging transducer, a plurality of ultrasound pulses to a volume of tissue, wherein transmissions of the plurality of ultrasound pulses are separated by an interval of time;
   in response to transmitting each of the plurality of ultrasound pulses, receiving a reflected signal from the volume of tissue, wherein the reflected signal includes reverberant signals that do not originate from the volume of tissue;
   filtering the reflected signal to attenuate portions of the reflected signal attributable to the reverberant signals; and
   generating an ultrasound image of the volume of tissue based on the filtered signals.

10. The method of example 9 wherein transmitting a plurality of ultrasound pulses comprises transmitting pulses separated by a fixed or variable interval of time.

11. The method of example 9 wherein filtering the reflected signals comprises filtering the signals using a low-pass filter, and wherein the low-pass filter is at least one of a regression filter, a finite-impulse-response filter, an infinite-impulse-response filter, and a band-stop filter.

12. The method of example 9, further comprising translating the imaging transducer a fixed amount between the transmissions of the plurality of ultrasound pulses.

13. The method of example 9, further comprising:
transmitting, by the imaging transducer, a second plurality of ultrasound pulses to the volume of tissue;
in response to transmitting each of the second plurality of ultrasound pulses, receiving a second reflected signal from the volume of tissue, wherein the second reflected signal includes reverberant signals that do not originate from the volume of tissue;
filtering the second reflected signal to attenuate portions of the second reflected signal attributable to the reverberant signals;
generating a second ultrasound image of the volume of tissue based on the second filtered signals; and
comparing the first and second ultrasound images to further attenuate portions of the images attributable to the reverberant signals.

14. The method of example 13 wherein comparing the first a second ultrasound images comprises filtering the images using at least one of a mean, median, and minimum filter.

15. A method of attenuating a non-stationary artifact in an ultrasound image, the method comprising:
capturing a first set of ultrasound image data including the artifact by applying a first signal on a first signal pathway;
capturing a second set of ultrasound image data by applying a second signal on a second signal pathway; and
combining the first set of data and second set of data to eliminate the artifact.

16. The method of example 15 wherein combining the first set of data and second set of data comprises filtering the first set of data and second set of data using a low-pass filter.

17. The method of example 15 wherein capturing the first set of ultrasound image data occurs at a first time interval and capturing the second set of ultrasound image data occurs at a second time interval spaced apart from the first time interval.

18. The method of example 15 wherein applying a second signal on a second signal pathway comprises applying a second signal on a second signal pathway having a different pathway length or pathway route from the first signal pathway.

19. The method of example 15 wherein combining the first set of data and second set of data to eliminate the artifact comprises applying at least one of a mean, median, or minimum filter to the first set of data and the second set of data.

20. The method of example 19, further comprising selecting at least one of the mean, median, or minimum filter based at least in part on a variance between the first set of data and the second set of data.

21. A physical computer-readable storage medium having stored thereon, computer-executable instructions that, if executed by a computing system, cause the computing system to perform operations comprising:
instructing an imaging transducer to apply a first signal on a first signal pathway;
receiving a first set of ultrasound image data including an artifact based on the first signal;
instructing the imaging transducer to apply a second signal on a second signal pathway;
receiving a second set of ultrasound image data based on the second signal; and
combining the first set of data and second set of data to eliminate the artifact.

22. The physical computer-readable storage medium of example 21 wherein the operations further comprise filtering the first set of ultrasound image data and the second set of ultrasound image data using at least one of a mean, median, or minimum filter.

23. The physical computer-readable storage medium of example 21 wherein the operations further comprise filtering the first set of data and second set of data using a low-pass filter.

24. The physical computer-readable storage medium of example 21 wherein instructing the imaging transducer to apply the second signal on the second signal pathway comprises instructing the imaging transducer to apply the second signal on a second signal pathway having a different pathway length or pathway route from the first signal pathway.

25. The physical computer-readable storage medium of example 21 wherein the operations further comprise translating the imaging transducer a fixed amount between applying the first signal and applying the second signal.

26. An ultrasound imaging system, comprising:
an imaging transducer configured to deliver ultrasound pulses to a volume of tissue;
a receiver configured to receive a reflected signal from the volume of tissue, wherein the reflected signal includes reverberant signals that do not originate from the volume of tissue; and
a controller programmed to filter the reflected signal to attenuate portions of the reflected signal attributable to the reverberant signals and generate an ultrasound image of the volume of tissue based on the filtered signal.

27. The system of example 26 wherein the imaging transducer is configured to deliver ultrasound pulses separated by a fixed or variable interval of time.

28. The system of example 26 wherein the controller programmed to filter the reflected signal comprises a controller programmed to filter the reflected signal using a low-pass filter, and wherein the low-pass filter comprises at least one of a regression filter, a finite-impulse-response filter, an infinite-impulse-response filter, and a band-stop filter.

29. The system of example 26, further comprising a movement mechanism configured to move the imaging transducer and thereby modify the length of the reflected signal.

30. The system of example 26 wherein the controller programmed to filter the reflected signal comprises a controller programmed to filter the reflected signal using at least one of a mean, median, or minimum filter.

From the foregoing it will be appreciated that, although specific embodiments of the technology have been described herein for purposes of illustration, various modifications may be made without deviating from the spirit and scope of the technology. For example, the systems and methods described herein can be used to filter artifacts other than non-stationary reverberation artifacts. More specifically, as a means to remove stationary artifacts, non-stationary reverberation artifact techniques can also be used in a device that would otherwise have only stationary artifacts, by varying the imaging transducer distance relative to the patient tissue interface. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A method of obtaining an ultrasound image, the method comprising:
    taking a first ultrasound image of a target tissue via an applicator, the applicator comprising a high-intensity focused ultrasound (HIFU) transducer, wherein the first ultrasound image includes a first reverberation artifact ultrasound path length;
    after taking the first ultrasound image, adjusting an angle of at least a portion of the HIFU transducer;
    taking a second ultrasound image of the target tissue via the applicator at the adjusted angle, wherein the second ultrasound image includes a second reverberation artifact ultrasound path length different than the first reverberation artifact ultrasound path length; and
    synthesizing the first ultrasound image with the second ultrasound image to produce a filtered image without a reverberation artifact, by utilizing a minimum filter,
    wherein the first ultrasound image includes a plurality of first pixels and the second ultrasound image includes a plurality of second pixels, and wherein pixels of the filtered image are selected from one of the first pixels or the second pixels, and
    wherein each of the first and second pixels are associated with a pulse, and further wherein utilizing the minimum filter comprises filtering the first and second pixels based on minimum amplitudes of the pulses associated with the first and second pixels.

2. The method of claim 1 wherein adjusting the angle of at least a portion of the HIFU transducer includes adjusting an angle of a reflective surface of the HIFU transducer.

3. The method of claim 1 wherein the applicator further comprises an imaging transducer, the method further comprising adjusting an angle of the imaging transducer.

4. The method of claim 1 further comprising translating a portion of the applicator.

5. The method of claim 1 wherein adjusting the angle of at least a portion of the HIFU transducer comprises moving a steering wobble.

6. The method of claim 1 wherein:
    the first ultrasound image is captured at a first time interval; and
    the second ultrasound image is captured at a second time interval spaced apart from the first time interval by a predetermined amount.

7. The method of claim 1 wherein the applicator includes an imaging transducer, and wherein moving at least a portion of the HIFU transducer comprises moving at least a portion of the HIFU transducer independently of moving the imaging transducer.

8. A method of obtaining an ultrasound image, the method comprising:
    taking a first ultrasound image of a target tissue via an applicator, the applicator comprising a high-intensity focused ultrasound (HIFU) transducer and an imaging transducer;
    independently of moving the imaging transducer, moving at least a portion of the HIFU transducer to adjust an angle thereof, wherein adjusting the angle of at least a portion of the HIFU transducer modifies a reverberation artifact ultrasound path length;
    taking a second ultrasound image of the target tissue via the applicator; and
    synthesizing the first ultrasound image with the second ultrasound image, thereby eliminating the reverberation artifact, by utilizing a weighted mean filter,
    wherein the first ultrasound image includes a plurality of first pixels and the second ultrasound image includes a plurality of second pixels, and further wherein pixels of the synthesized image are selected from one of the first pixels or the second pixels, and
    wherein each of the first and second pixels are associated with a pulse, and wherein utilizing the weighted mean filter comprises filtering the first and second pixels based on weighted mean amplitudes of the pulses associated with the first and second pixels, and further wherein the amplitudes are weighted in inverse proportion to their amplitudes.

* * * * *